(12) United States Patent
Templeman

(10) Patent No.: US 7,637,225 B2
(45) Date of Patent: Dec. 29, 2009

(54) ADJUSTABLE STRAP APPARATUS

(75) Inventor: Jon C. Templeman, Overland Park, KS (US)

(73) Assignee: Marine Dynamics, Inc., Lenexa, KS (US)

( * ) Notice: Subject to any disclaimer, the term of this patent is extended or adjusted under 35 U.S.C. 154(b) by 0 days.

(21) Appl. No.: 11/489,854

(22) Filed: Jul. 20, 2006

(65) Prior Publication Data

US 2008/0017095 A1 Jan. 24, 2008

(51) Int. Cl.
*B63B 17/00* (2006.01)
(52) U.S. Cl. .................................. 114/363
(58) Field of Classification Search ............... 114/363
See application file for complete search history.

(56) References Cited

U.S. PATENT DOCUMENTS

| 5,472,260 | A | * | 12/1995 | Czapski et al. | 297/112 |
| 6,080,124 | A | * | 6/2000 | Falk et al. | 602/26 |
| 7,144,085 | B2 | * | 12/2006 | Vits et al. | 297/483 |
| 2002/0145314 | A1 | * | 10/2002 | Kucera | 297/188.06 |

FOREIGN PATENT DOCUMENTS

JP 2001253279 A * 9/2001

* cited by examiner

*Primary Examiner*—Stephen Avila
(74) *Attorney, Agent, or Firm*—McAfee & Taft

(57) ABSTRACT

A strap apparatus for holding a foldable boat seat including a seat back pivotally connected to a seat base in a folded down position is provided. The strap apparatus comprises an elongated strap body that is made of a material having a high stretch resistance, a first fastener for attaching the strap body to the seat base, and a second fastener for removably attaching the strap body to the seat back such that when the strap body is attached to the seat back, at least a portion of the strap body extends between the first fastener and the second fastener. Strap adjustment apparatus are associated with the strap body and function to adjust the length of the portion of the strap body that extends between the first fastener and the second fastener when the strap body is attached to the seat back and thereby allow the seat back to be pulled down tight against the seat base. A foldable boat seat and a method of installing a replacement foldable boat seat strap on a foldable boat seat are also provided. The adjustable strap apparatus is also useful in general marine and other applications.

9 Claims, 7 Drawing Sheets

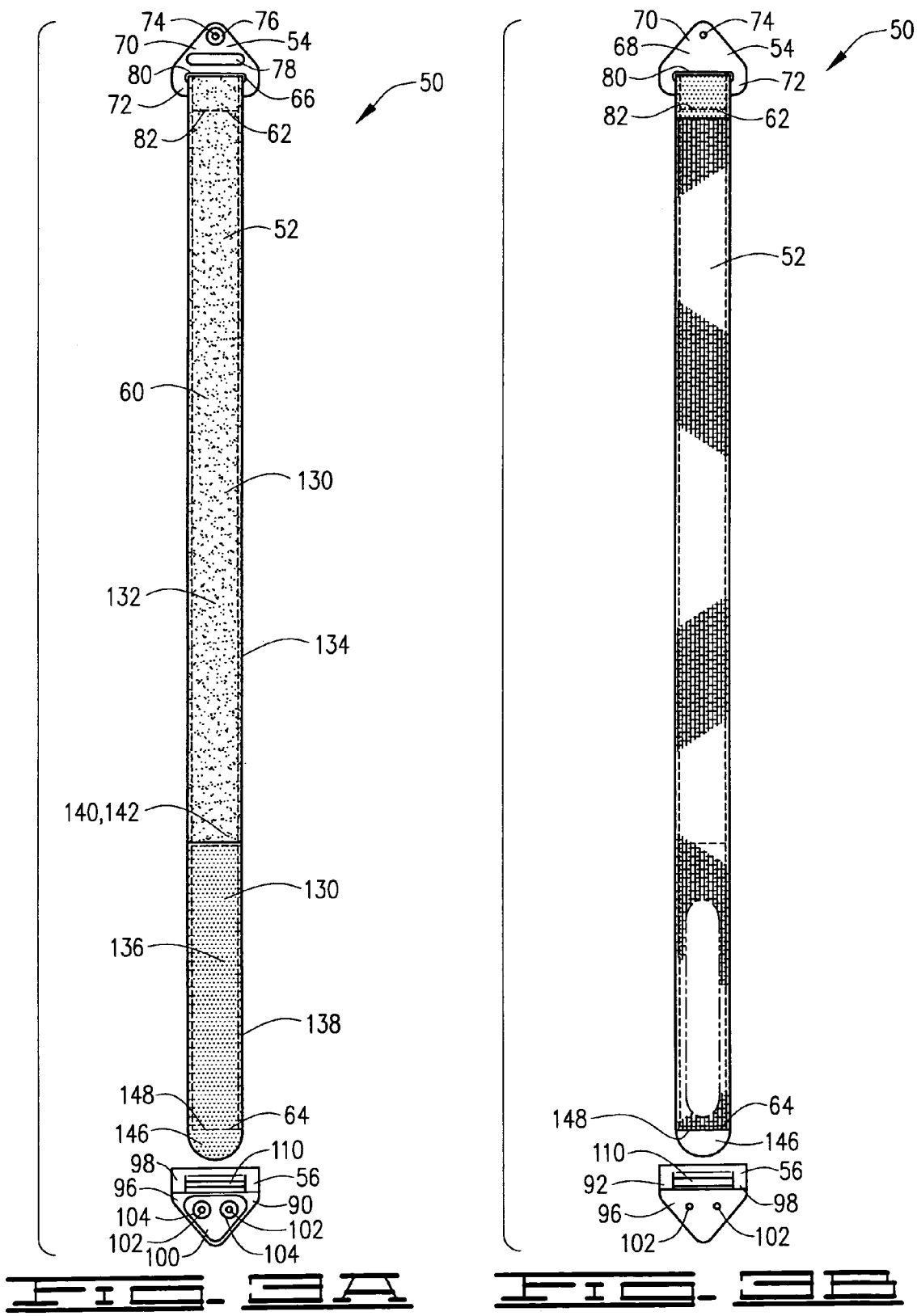

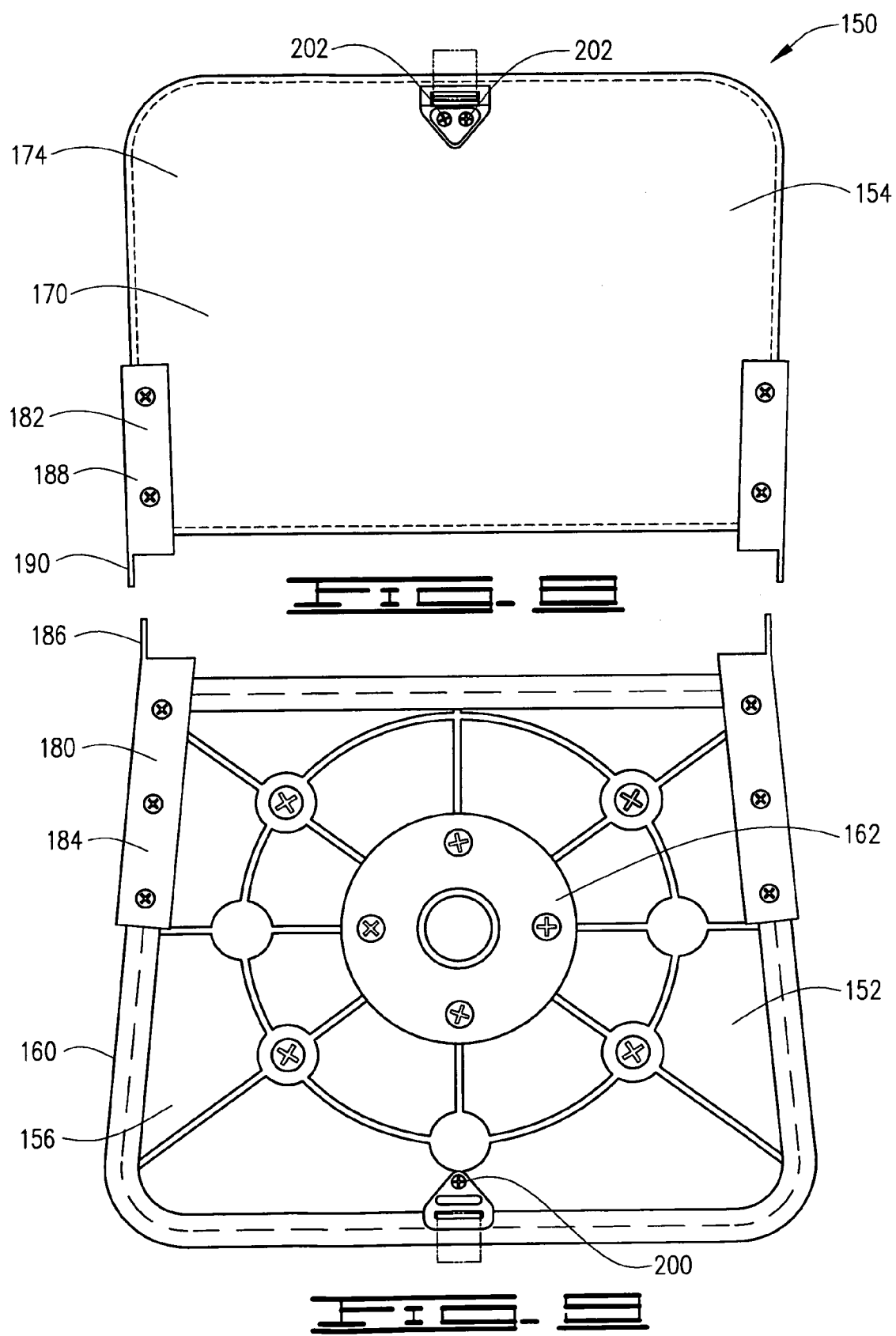

ADJUSTABLE STRAP APPARATUS

BACKGROUND OF THE INVENTION

This invention relates to adjustable strap apparatus. In one aspect, the invention relates to adjustable strap apparatus for holding open air foldable boat seats in a folded down position. In another aspect, the invention relates to foldable boat seats.

Fold-down or foldable boat seats are commonly used in fishing boats and other types of watercraft. The seat back of such seats is pivotally mounted to the seat base. A strap attached to the seat base is attachable to the seat back to hold the seat back firmly against the seat base when the seat is not in use. Maintaining the boat seat in the folded down position when the seat is not in use improves the aerodynamic properties of the boat when the boat is operated and towed and facilitates the placement of a cover on the boat.

In order to assure a proper match, the strap used to hold a foldable boat seat in the folded down position is usually made of the same material that is used to cover the seat, which is typically a vinyl material. A piece of the vinyl material is folded and sewn together, and snaps are installed on the ends thereof to fit corresponding snaps on the seat base and seat back. A piece of foam is sometimes inserted inside the strap to impart a degree of structural integrity to the strap.

Vinyl materials are tensile or ductile, that is, capable of being stretched or drawn out when tensile stress is applied thereto. Such straps do to have any elasticity and therefore do not recover their original shape after a deforming force has been removed. The permanent set or permanent elongation of the strap after it is stretched prevents the strap from maintaining the seat back tight against the seat base and negatively affects the aesthetics of the strap.

Unfortunately, normal operation and towing of the boat results in the application of significant stress to the strap when the strap is used to hold the boat seat in the folded down position. When fastened in place, the strap is pulled and stretched due to wind, waves, bumps in the road and so forth. For example, the constant flow of air on the front and top of the seat back puts tensile pressure on the seat strap. This concentrated force alone causes the seat strap to stretch, allowing the seat back to rise, causing more and more wind resistance and more and more stretching. Once a vinyl strap is stretched, it very quickly begins to look worn out and often cracks and tears. The increased wind resistance created by boat seats that are not held tightly in the folded down position decreases the performance and fuel efficiency of the boat or towing vehicle.

Due to the fact that the seat strap is made of the same material as the seat cover, the strap is not sold as a separate part. As a result, once the strap wears out, it is usually necessary to replace the entire seat. Since the replacement seat usually will not match the other seats in the boat, many boat owners end up replacing all of the seats in the boat, which can be expensive.

Thus, there is a need for a foldable boat seat strap that can be used to replace old, worn out seat straps without having to replace the entire seat. There is also a need for a foldable boat seat strap that does not quickly stretch and wear out due to normal use of the boat. Finally, there is a need for an improved adjustable strap apparatus that is useful in a variety of marine and other applications.

SUMMARY OF THE INVENTION

By the present invention, a strap apparatus for holding a foldable boat seat including a seat back pivotally connected to a seat base in a folded down position is provided. The invention also provides a foldable boat seat and a method of installing a replacement foldable boat seat strap on a foldable boat seat.

The inventive strap apparatus comprises an elongated strap body, a first fastener for attaching the strap body to the seat base of the boat seat, and a second fastener for removably attaching the strap body to the seat back of the boat seat such that when the strap body is attached to the seat back at least a portion of the strap body extends between the first fastener and the second fastener. The elongated strap body is made of nylon or some other material having a high stretch resistance.

The strap apparatus preferably also comprises strap adjustment apparatus associated with the strap body, the strap adjustment apparatus being capable of adjusting the length of the portion of the strap body that extends between the first fastener and the second fastener when the strap body is attached to the seat back. This feature allows the strap apparatus to tightly hold the seat back against the seat base if, for some reason, the length of the portion of the strap body that extends between the first fastener and the second fastener increases. The strap adjustment apparatus allows the effective length of the strap to be increased or decreased by virtually any amount.

When the strap adjustment apparatus is utilized, the strap body can be made out of vinyl or other materials that do not have a high stretch resistance. However, preferably the strap body is still made of a material having a high stretch resistance. Even though the stretch resistance of the strap body is high, the strap may still become loose when fastened due to a change in way the seat back is attached to the seat base or some other factor. In such event, the seat back can still be tightened securely against the seat base.

The inventive strap apparatus is very useful as a replacement foldable boat seat strap for old, stretched out or worn out foldable boat seat straps. It can also be used as the seat strap for new foldable boat seats. The inventive strap apparatus is useful in general marine and other applications as well.

The inventive foldable boat seat comprises a seat base, a seat back pivotally connected to the seat base such that the seat back can be folded down toward the seat base, and strap apparatus for holding the seat back in a folded down position. The strap apparatus is the inventive strap apparatus described above.

Thus, the invention provides a foldable boat seat strap apparatus that does not stretch out of shape and that can be easily adjusted to a virtually unlimited degree of tension thereby allowing the seat back to be maintained in a low and aerodynamic position when not in use. By including the inventive strap apparatus, the inventive boat seat is an improvement to new and replacement boat seats currently available.

The method of installing a replacement foldable boat seat strap on a foldable boat seat is described below.

Additional objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 3A is an elevation view of the lower side of the inventive strap apparatus.

FIG. 3B is an elevation view of the upper side of the inventive strap apparatus.

FIG. 8 is an enlarged rear elevation view of the seat back of the inventive boat seat showing the second fastener of the inventive strap apparatus attached thereto.

FIG. 9 is an enlarged bottom view of the seat base of the inventive boat seat showing the first fastener of the inventive strap apparatus attached thereto.

DESCRIPTION OF THE PREFERRED EMBODIMENTS

Figure 1:
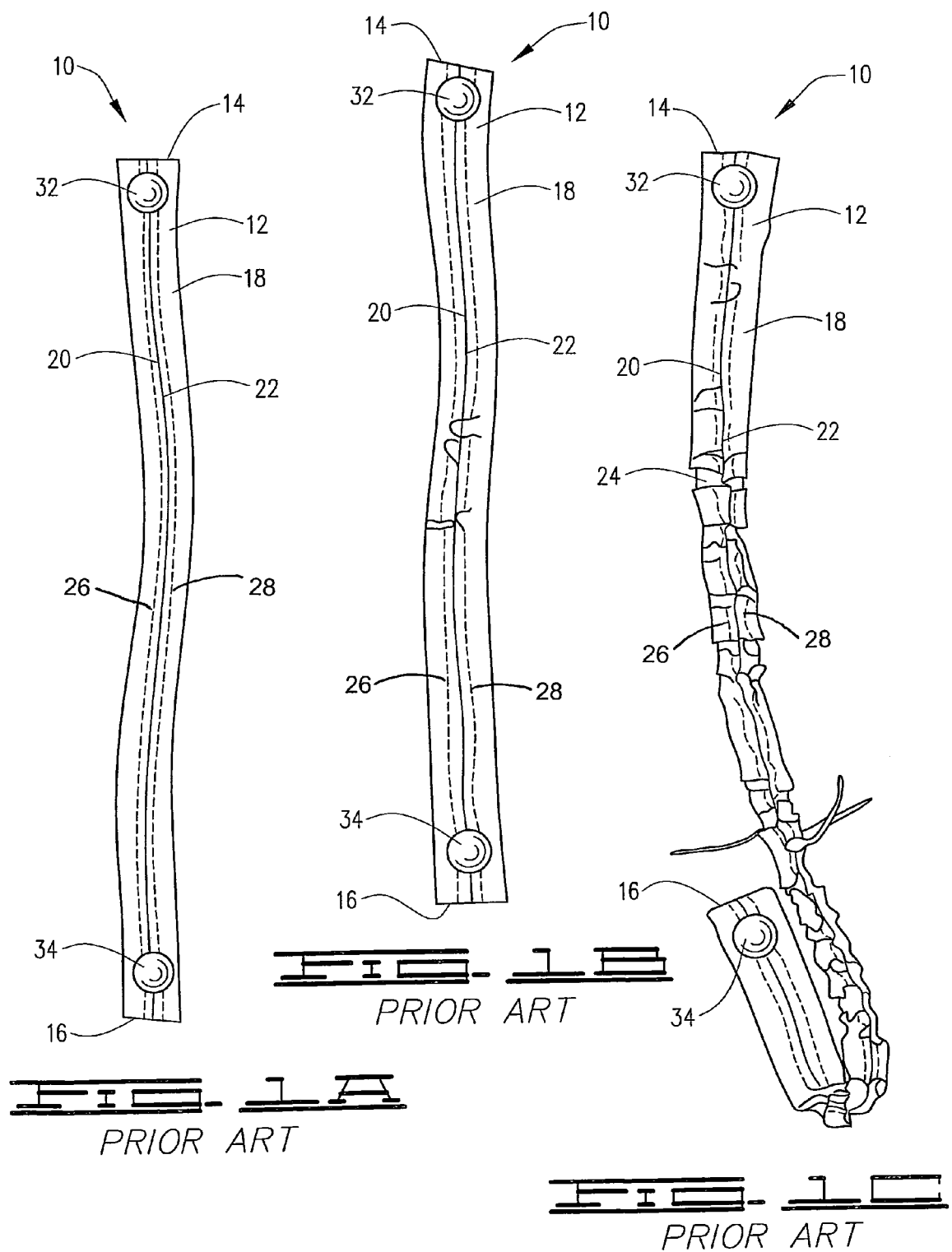
FIG. 1A illustrates a prior art foldable boat seat strap.
FIGS. 1B and 1C illustrate the prior art foldable seat strap illustrated by FIG. 1 after use of the strap.

Referring now to the drawings, and particularly to FIGS. 1A-1C, a prior art, OEM (original equipment manufacture) foldable boat seat strap is illustrated and generally designated by the reference numeral 10. The prior art boat seat strap 10 is formed of a rectangular sheet of vinyl material 12 having an first end 14, second end 16, middle portion 18, first side 20 and second side 22. As shown by FIG. 1C, an elongated foam section 24 that is approximately the same length and ⅓ to ½ the width of the sheet 12 is placed on top of the middle portion 18 of the sheet. The sides 20 and 22 of the sheet 12 are then folded over the foam section 24 and sewn along lines 26 and 28, respectively, to the middle portion 18 of the sheet. Snaps 32 and 34 are attached to the ends of the strap 10 for attachment to corresponding snap fittings on the seat base and seat back of the boat seat.

FIG. 1A illustrates the prior art boat seat strap 10 prior to significant use of the boat. As shown by FIG. 1B, after moderate use of the boat (for example, 20 hours), the strap 10 has stretched to some extent and some of the threads holding the strap together have become loose. As shown by FIG. 1C, after further use of the boat (for example, 80 hours), the strap 10 has been significantly stretched causing many of the threads holding the strap together to unravel, the sheet 12 to crack and tear and the strap in general to fall apart.

Figure 2:
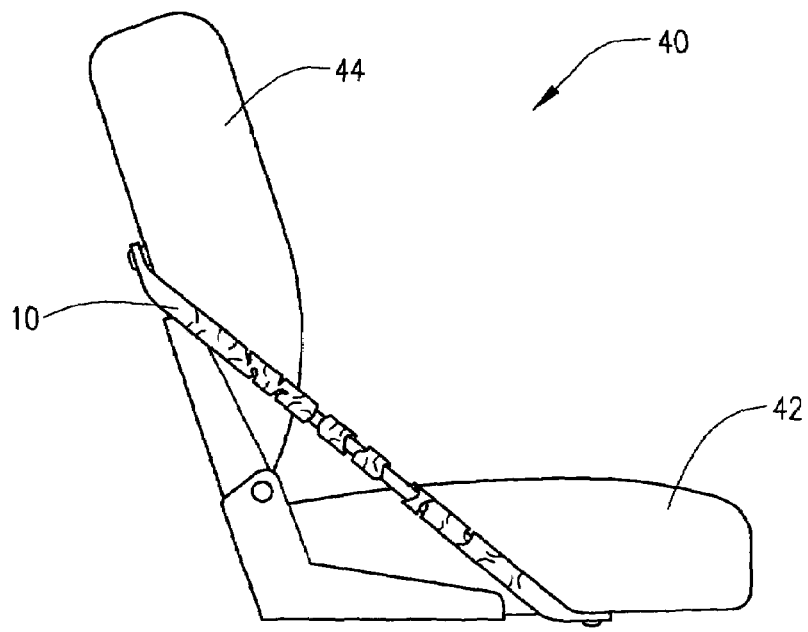
FIG. 2 illustrates a foldable boat seat having a prior art foldable boat seat strap attached thereto after significant use of the boat.

FIG. 2 illustrates a stretched out prior art boat seat strap 10 attached to a boat seat 40. One end of the strap 10 is attached to the seat base 42 while the other end of the strap 10 is attached to the seat back 44. As shown, the strap 10 is so stretched out that it is no longer capable of holding the seat back 44 down against the seat base 42.

FIGS. 1A-1C and FIG. 2 are intended merely to illustrate what happens to prior art foldable boat seat straps upon normal use of the boat. The exact condition of such a strap after 20 hours and 80 hours, for example, will vary depending on the type of material used to form the strap, how the strap is manufactured and the conditions surrounding use of the boat.

Referring now to FIGS. 3A and 3B, the inventive strap apparatus for holding a foldable boat seat including a seat back pivotally connected to a seat base in a folded down position is illustrated and generally designated by the reference numeral 50. The strap apparatus 50 comprises an elongated strap body 52, a first fastener 54 for attaching the strap body to the seat base, a second fastener 56 for removably attaching the strap body to the seat back, and strap adjustment apparatus 60 associated with the strap body. The second fastener 56 removably attaches the strap body 52 to the seat back such that when the strap body is attached to the seat back at least a portion of the strap body extends between the first fastener 54 and the second fastener. The strap adjustment apparatus 60 is capable of adjusting the length of the portion of the strap body 52 that extends between the first fastener 54 and the second fastener 56 when the strap body is attached to the seat back.

The strap body 52 has a first end 62 and a second end 64 and is made of a material that has a high stretch resistance. As used herein and in the appended claims, a high stretch resistance means a resistance to stretching sufficient to prevent the strap body from stretching by an amount greater than one inch due to normal operation of the boat. A lower stretch resistance can result in enough of a gap between the seat back and the seat base to allow wind to have a more dramatic effect which in turn can negatively affect the performance of the boat and/or appearance of the strap. Preferably, the strap body 52 is made of a material that has a resistance to stretching sufficient to prevent the strap body from stretching by an amount greater than one-half inch (½ inch) due to normal operation of the boat. Most preferably, the strap body 52 is made of a material that has a resistance to stretching sufficient to prevent the strap body from stretching by any amount due to normal operation of the boat.

The strap body 52 is preferably made of nylon or polypropylene. In one embodiment, the strap body is formed of polypropylene and has a thickness of 1.35 ml and a width of one inch. In this embodiment, the strap body has a pull strength of 200-220 kg and is made up of 56-60 yarns per thread. It has a warp thread of 107 and a weft thread of one.

The first fastener 54 is a plate having an upper surface 66 and lower surface 68. The first fastener 54 includes a base portion 70 for attachment to the seat base and a strap receiver 72. As shown, the first fastener 54 has the general shape of a triangle. However, the fastener 54 can be formed in other shapes as well, including round, oval, square, rectangular and other polygonal shapes. The base portion 64 includes a round screw opening 74 extending therethrough for receiving a screw or other fastening device for securing the first fastener 54 to the seat base. A recessed section 76 is included in the upper surface 66 of the first fastener 54 over the screw opening 74 so that the head of the screw or other fastening device used to secure the first fastener 54 to the seat base will be flush with the upper surface. The upper surface 66 of the base portion 70 also includes an oval shaped recessed section 78 in which identifying information such as a brand name or logo for the strap apparatus can be inserted.

The strap receiver 72 includes an elongated slot 80 extending therethrough for receiving the first end 62 of the strap body 52. As best shown by FIGS. 3A and 3B, the first end 62 of the strap body 52 is looped through the slot 80 and pulled down approximately ¾ of an inch onto the strap body and sewn along line 82 to the strap body. This permanently secures the strap body to the first fastener 54. However, the strap body 52 can also be removably attached to the first fastener 54 using a hook and loop fastening system or other fastening means as described below.

The second fastener 56 is a plate having an upper surface 90 and lower surface 92. The second fastener 56 includes a base portion 96 for attachment to the seat base and a strap receiver 98. As shown, the second fastener 56 also has the general shape of a triangle. However, the fastener 56 can be formed in other shapes as well, including round, oval, square, rectangular and other polygonal shapes. The upper surface 90 of the second fastener 56 has a primary recessed section 100 disposed therein. The primary recessed section 100 is positioned in the base portion 96 of the second fastener 56.

Two screw openings 102 are positioned in the primary recessed section 100 and extend through the base portion 96 for receiving screws or other fastening devices for securing the second fastener 56 to the seat back. A secondary recessed section 104 is included in the upper surface 90 of the second fastener 56 over each screw opening 102 so that the head of the screws or other fastening devices used to secure the second fastener 56 to the seat back will be flush with the floor 106 of the primary recessed section 100.

The second fastener 56 also includes a screw head cover 108 that is capable of being inserted into the primary recessed section 100 to cover screws or other fastening devices that extend through the screw openings 102 to secure the second fastener 56 to the seat back. The cover 108 is preferably made of plastic or some other durable material and has a shape that corresponds to the shape of the primary recessed section 100. The cover 108 is in the form of a thin sheet and has overall dimensions (e.g., side lengths) that allow it to fit snugly within the primary recessed section 100. An adhesive that helps removably attach the cover 108 to the floor 106 of the primary recessed section is preferably applied to the bottom of the cover. Identifying information such as a brand name or logo for the strap apparatus can be applied to the cover 108 such that it is visible on or through the top of the cover.

In the embodiment illustrated by the drawings, the primary recessed section 100 and cover 108 each have the general shape of a triangle. However, the primary recessed section 100 and cover 108 can also be formed in other shapes including round, oval, square, rectangular and other polygonal shapes.

The strap receiver 98 includes an elongated slot 110 extending therethrough for receiving the second end 64 of the strap body 52. The slot 110 includes a frame 112 having a base surface 114, a top surface 116 and sidewalls 118 connecting the base surface to the top surface. The top surface 116 is rounded or beveled to facilitate the process of lopping the second end 64 of the strap body 52 through the slot 110 (described below) and movement of the strap body 52 over the top surface. The rounded contour of the top surface 116 prevents the surface from rubbing through or tearing the strap body over time.

Figure 5A:
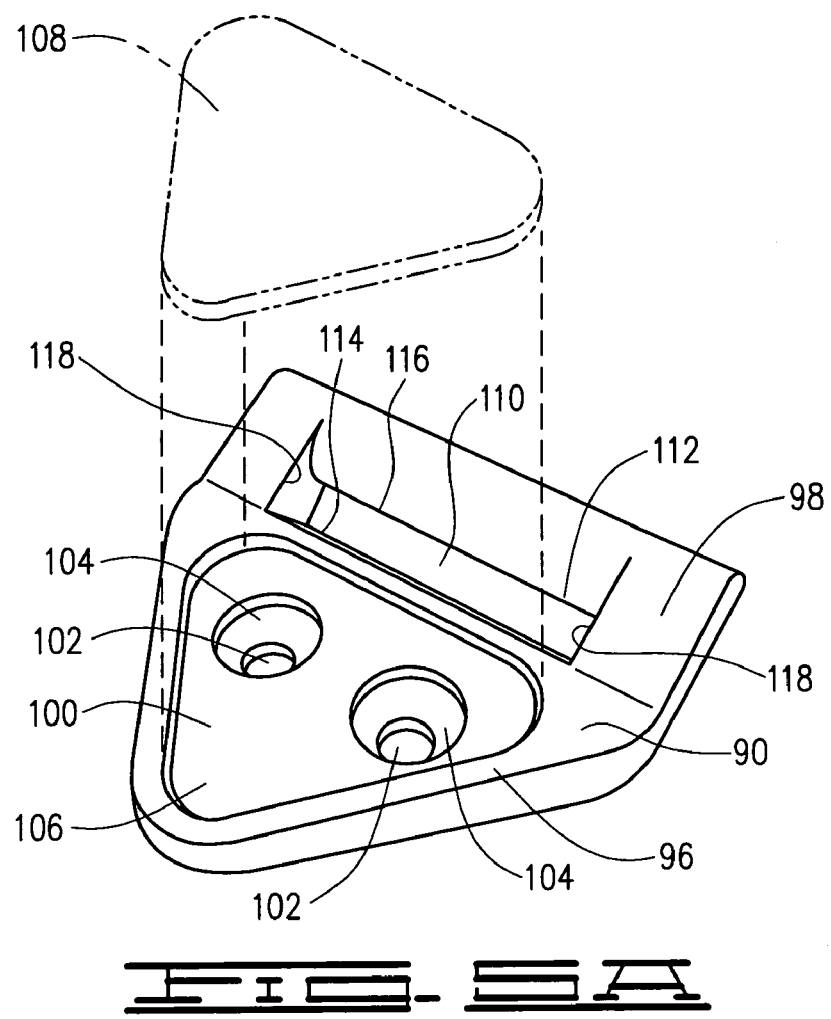
FIG. 5A is an exploded detailed view illustrating the second fastener of the inventive strap apparatus.
Figure 5B:
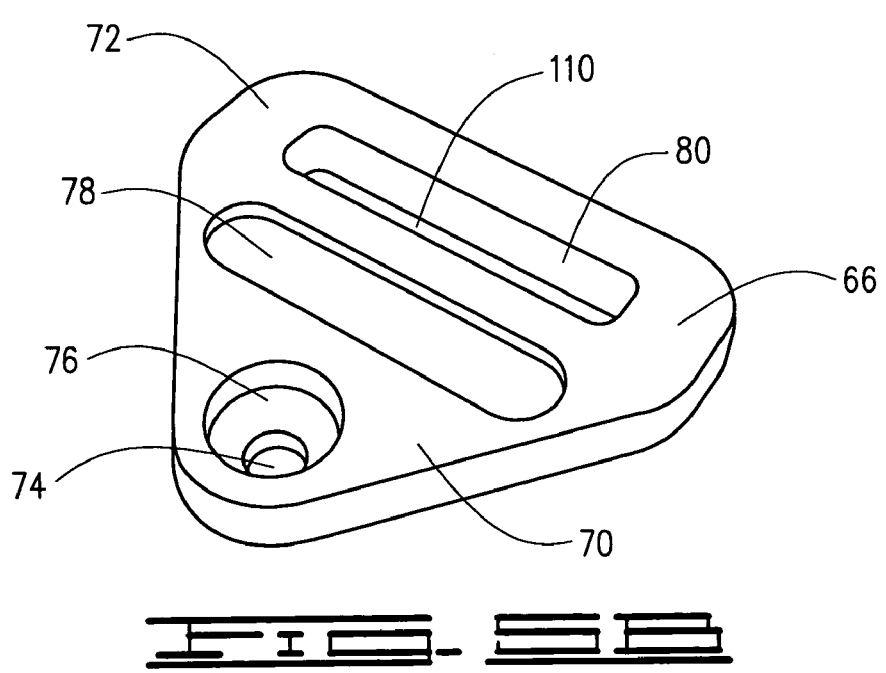
FIG. 5B is an exploded detailed view illustrating the first fastener of the inventive strap apparatus.
Figure 6:
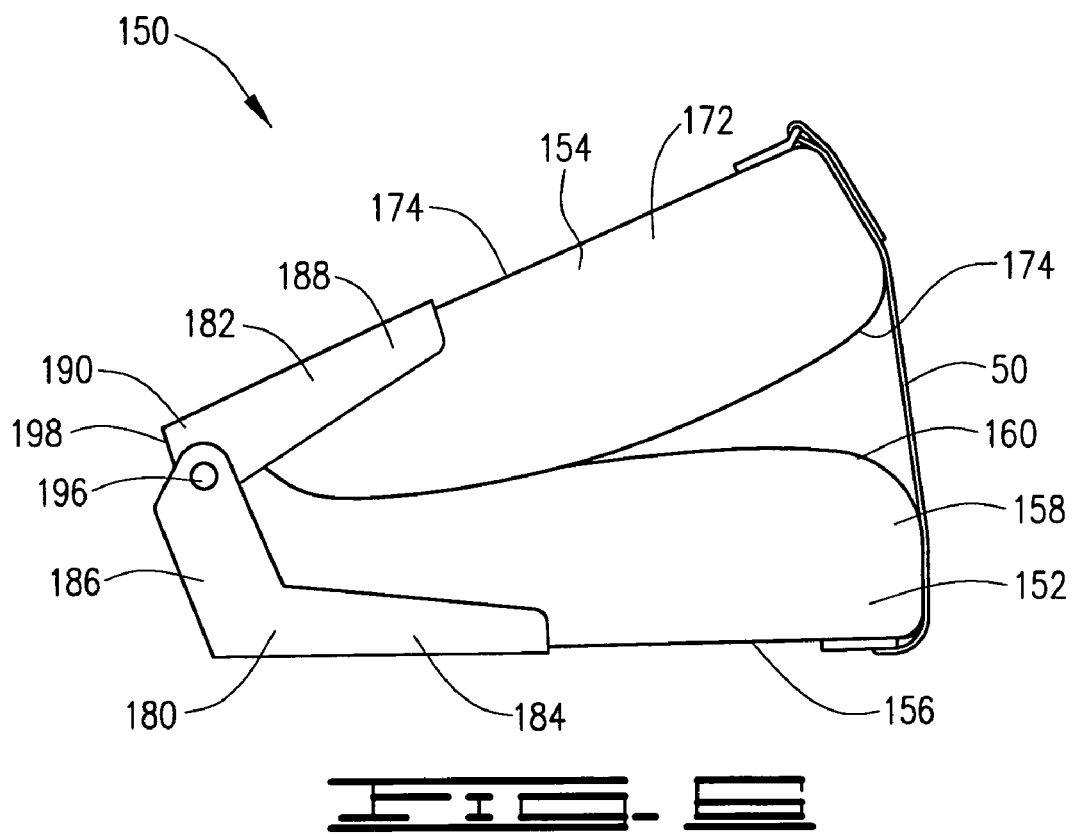
FIG. 6 is a side view of the inventive boat seat showing use of the inventive strap apparatus to hold the seat back in the folded down position.
Figure 7:
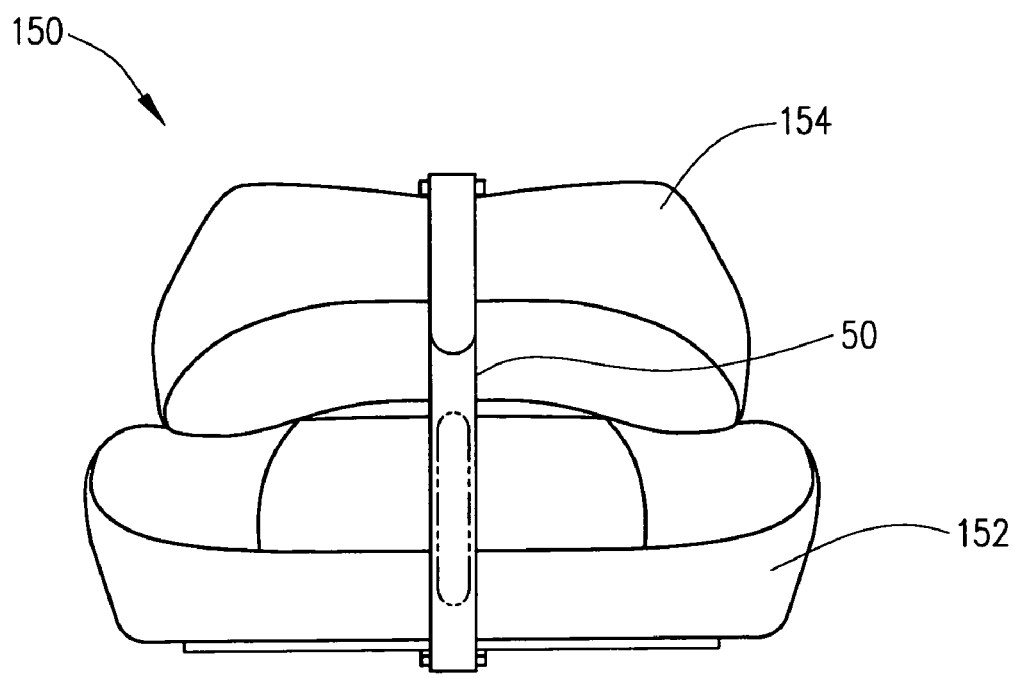
FIG. 7 is a front view of the inventive boat seat and strap apparatus shown by FIG. 6.

As best shown by FIGS. 3A and 3B, the second end 64 of the strap body 52 is looped through the slot 110 and pulled down onto the strap body and removably attached thereto. As best shown by FIG. 5A, unlike the strap receiver 72 of the first fastener 54, the strap receiver 98 of the second fastener 56 extends outwardly from the base portion 96 of the second fastener. This facilitates the step of looping the second end 64 of the strap body 52 through the slot 110 when the second fastener 56 is attached to the seat back. The strap receiver 98 preferably extends outwardly from the base portion 96 of the second fastener at an angle in the range of from about 15 to about 120 degrees, more preferably at an angle in the range of from about 35 to about 55 degrees, most preferably at an angle of about 45 degrees.

Figure 4:
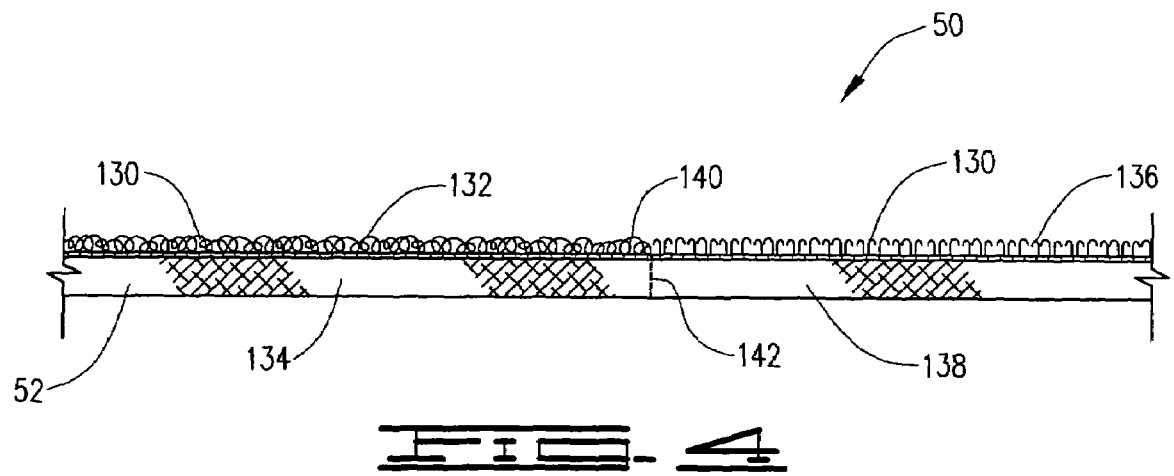
FIG. 4 is a side, enlarged detail view of a portion of the elongated strap body of the inventive strap apparatus.

The strap adjustment apparatus 60 includes a hook and loop fastening system 130. As best shown by FIGS. 3A, 3B and 4, a section of loop material 132 is attached (preferably sewn) to a first section 134 of the strap body 52 of the strap apparatus 50. A section of hook material 136 is attached (preferably sewn) to a second section 138 of the strap body. The section of loop material 132 and section of hook material 136 can also be made of nylon, polypropylene or some other suitable material, and can be integrally formed with the strap body if desired. The section of loop material 132 and the first section 134 of the strap body 52 preferably extend from the first end 62 of the strap body for a distance that is in the range of from 50% to about 75% of the total length of the strap body. The section of hook material 136 and the second section 138 of the strap body 52 preferably extend from the inner ends 140 and 142 of the section of loop material 132 and second section 134, respectively, along the remaining length of the strap body. As shown by FIG. 3A, the outer end 146 of the section of hook material 136 extends slightly beyond the outer end 148 of the second section 138 of the strap body 52 to facilitate removal of the section of hook material 136 from the section of loop material 148.

As understood by those skilled in the art, the section of hook material 136 includes a dense arrangement of tiny hooks (i.e., upright hooks and similar structures) 140, whereas the section of loop material 132 includes a dense arrangement of pile (i.e., upright loops and similar structures) such that the section of hook material and section of loop material interlock when pressed together. Suitable hook and loop materials for forming the hook and loop fastening system 130 are marketed by Velcro USA Inc. under the brand name Velcro® as well as other manufacturers.

At least a portion of the section of hook material 136 can be removably attached to at least a portion of the section of loop material 138 to removably attach at least a portion of the first section 134 of the strap body 52 to at least a portion of the second section 138 of the strap body. This allows the strap body 52 to be secured to the second fastener 56 and the length of the portion of the strap body 52 that extends between the first fastener 54 and the second fastener to be adjusted as necessary to firmly hold the seat back against the seat base when the seat is not in use. Specifically, the second end 64 of the strap body 52 can be looped through the slot 110 (over the rounded top surface 116 thereof) and pulled downwardly to pull the seat back firmly against the seat base. A portion or all of the section of hook material 136 can then be pressed against a portion of the section of loop material 138 to interlock the two sections together and maintain the boat seat in a folded down position. The length of the portion of the strap body 52 that extends between the first fastener 54 and the second fastener 56 when the seat back is secured against the seat base can be quickly and easily increased or decreased by whatever amount is necessary to achieve a proper tension.

Referring now to FIGS. 6-9, the inventive foldable boat seat and method of installing a replaceable foldable boat seat strap on a foldable boat seat will be described.

The inventive boat seat, generally designated in the drawings by the reference numeral 150, comprises a seat base 152, a seat back 154 pivotally connected to the seat base such that the seat back can be folded down toward the seat base, and strap apparatus 50 for holding the seat back in a folded down position. The strap apparatus 50 is the inventive strap apparatus 50 described above. The inventive boat seat can be installed on new boats and/or sold as a replacement boat seat for existing boats.

The seat base 152 comprises a base frame 156, a seat cushion 158 and a seat cover 160. The seat cushion 158 is positioned on top of the base frame 156. The seat cover 160, typically made of a vinyl material, is wrapped around the seat cushion 158 and stapled to the back of the base frame 156. The base frame 156 includes a metal or plastic plate 162 for receiving one end of an upright tubular seat pole attached at its other end to the floor of the boat (not shown).

The seat back 154 includes a back frame 170, a seat back cushion 172 positioned on top of the back frame and a seat back cover 174, typically made of the same material used to form the seat cover 160, positioned completely around the seat back cushion and back frame.

The boat seat 150 also includes a pair of lower brackets 180 and a pair of upper brackets 182. Each lower bracket 180 includes a leg member 184 and extension arm member 186. Similarly, each upper bracket 182 includes a leg member 188 and extension arm 190. The leg members 184 of the lower brackets 180 are attached to the base frame 170, whereas the leg members 188 of the upper brackets 182 are attached to the back frame 170. Each of the extension arms 186 of the lower brackets 180 is attached to a corresponding extension arm 190 of an upper bracket 182 by a rivet 196. This arrangement allows the upper brackets 182 to pivot downwardly toward the lower brackets 180. A stop 198 in the upper brackets 182 prevents the upper brackets 182 from pivoting backwardly behind the lower brackets 180.

As best shown by FIG. 9, the first fastener 54 attaches the strap body 52 of the strap apparatus 50 to the seat base 152. A screw 200 extends through the screw opening 74 in the base portion 70 of the first fastener 54 to secure the first fastener to the bottom of the base frame 156. Similarly, as best shown by FIG. 8, the second fastener 56 is attached to the lower surface of the back frame 170. Screws 202 extend through the screw openings 102 in the base portion 96 of the second fastener 56 into the back frame 170 to secure the second fastener to the back frame.

Figure 10A:
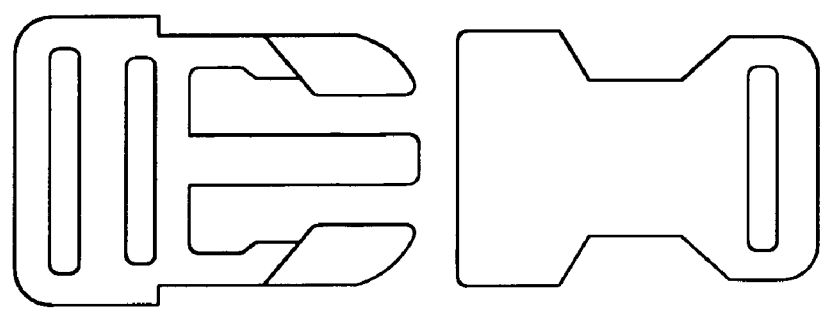
FIGS. 10A, 10B and 10C illustrate alternative embodiments of the strap adjustment apparatus of the inventive strap apparatus.
Figure 10B:
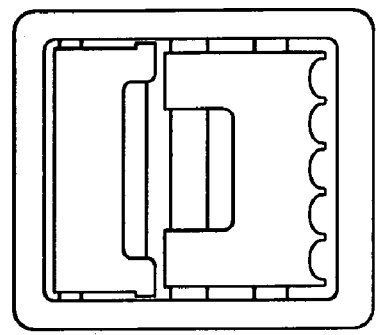
Figure 10C:
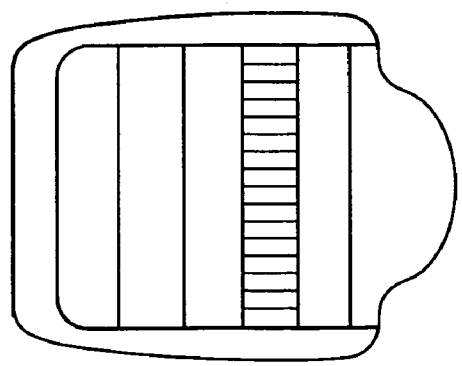

Certain modifications can be made to the inventive strap apparatus and boat seat without causing the strap apparatus to lose any functionality. For example, instead of the hook and loop fastening system 130, the strap adjustment apparatus 60 can include other strap adjustment means such as conventional strap locks. Examples of such strap locks are shown by FIGS. 10A-10C.

The inventive method of installing a replacement foldable boat seat strap on a foldable boat seat includes the following steps:

(a) First, the old seat strap is removed.

(b) Next, the first fastener 54 (having the first end 62 of the strap body 52 of the inventive strap apparatus 50 permanently attached thereto as described above) is centered on the lower side of the base frame 156 as shown by FIG. 9. Using the first fastener 54 as a template and a 3/32 inch drill bit, a pilot hole is drilled through the screw opening 74 of the fastener to a depth of about 1/2 inch into the base frame 156. A screw 200 is then inserted through the screw opening 74 to attach the first fastener 54 to the seat base 152.

(c) The cover 108 is then removed from the primary recessed opening 100 of the second fastener 56 by inserting a straightened paperclip or similar device through the lower surface 92 of the second fastener into one of the screw openings 102 thereof and gently pushing the adhesive back cover out of the primary recessed section. It is important to be careful to avoid re-sticking the cover 108 to any other surface until the cover is reinserted into the primary recessed section 100.

(d) The second fastener 56 is then positioned on the seat back, preferably in a position that is approximately one inch from the top edge of the seat as shown by FIG. 8. Using the second fastener 56 as a template and a 3/32 inch drill bit, two pilot holes are drilled to a depth of approximately 1/2 inch into the back frame 170. Screws 202 are then inserted through the screw openings 102 to attach the second fastener 56 to the seat back 154. The cover 108 is reinserted into the primary recessed section 100.

In order to secure the boat seat 150 in the folded down position, the second end 64 of the strap body 52 of the strap apparatus 50 is inserted through the slot 110 of the second fastener 56 and pulled back down toward the first fastener 54. The strap body 52 is pulled toward the first fastener 54 until the seat back 152 is pulled down snug against the seat base 154. The section of hook material 136 is then pressed against the section of loop material 132 to interlock the sections 136 and 132 together and thereby removably attach the first section of the strap body 134 to the second section of the strap body 138 and maintain the seat in the folded down position. The strap body 52 can be tightened or loosened as necessary by merely grasping the outer end of the section of hook material 136 and pulling the section of hook material outwardly from the section of loop material 134, pulling the strap body 52 further down toward the first fastener 54 and repressing the section of hook material against the section of loop material. In order to use the seat, the outer end of the section of hook material 132 is merely grasped and pulled outwardly from the section of loop material 134 to loosen the strap. The strap body 52 is then removed from the second fastener 56 and the seat back 154 is raised up.

The inventive strap apparatus is easy to install and use in the above manner. For example, four of the strap apparatus 50 can be installed in a professional looking manner on four boat seats in about twenty minutes. The inventive strap apparatus 50 can be made in a variety of colors to match virtually any boat seat.

Thus, the inventive strap apparatus 50 can be used to replace an old, worn out and/or stretched out foldable boat seat strap without having to replace the entire seat. As a replacement foldable boat seat strap, the inventive strap apparatus 50 can impart a well maintained look to a boat and help maintain the resale value of the boat. Due to its functionality and durability, the inventive strap apparatus 50 can also be installed as the foldable boat seat strap used on new boat seats.

Unlike prior art foldable boat seat straps, the inventive strap apparatus does not stretch out of shape or rupture. Due to the strap adjustment apparatus, the strap can be tightened to virtually any tension. As a result, the seat back can always be held tight against the seat base when the boat seat is not in use making the boat more aerodynamic to operate and tow. The performance of the boat and the fuel efficiency of the boat and towing vehicle are improved. The inventive strap apparatus and boat seat also improve the safety of the boat by keeping the seat back from blocking the boat driver's view, from both the front and rear. The inventive strap apparatus also keeps the seat back from blocking the view of the driver of a towing vehicle.

The inventive strap apparatus can be used in numerous other marine applications and other applications in general. The strap apparatus is useful in any application in which a strap is subject to significant tensile and/or other stresses and in which stretching of the strap will negatively impact the functionality and/or appearance of the strap. As one example, the inventive strap apparatus can be used to hold a boat ladder in a collapsed or upright position.

What is claimed is:

1. A strap apparatus for holding a foldable boat seat including a seat back pivotally connected to a seat base in a folded down position, comprising:

an elongated strap body, said strap body being made of a material having a high stretch resistance;

a first fastener for attaching said strap body to the seat base;

a second fastener for removably attaching said strap body to the seat back such that when said strap body is attached to the seat back at least a portion of said strap body extends between said first fastener and said second fastener, said second fastener including an upper surface, a lower surface opposing said upper surface, a base portion for attachment to the seat back and a strap receiver including a slot for receiving said strap body wherein said upper surface of said second fastener has a primary recessed section disposed therein, said primary recessed section having one or more screw openings disposed therein and extending trough said base portion of said second fastener for receiving screws or other fastening devices for securing said second fastener to the seat back, and said second fastener further comprises a screw head cover capable of being inserted into said primary recessed section for cover screws or other fastening devices that extend through said one or more screw openings; and strap adjustment apparatus associated with said strap body, said strap adjustment apparatus being capable of adjusting the length of the portion of said strap body that extends between said first fastener and said second fastener when said strap body is attached to said seat back, said strap adjustment apparatus including a hook and loop fastening system, said hook and loop fastening system including a section of hook material attached to a first section of said strap body and a section of loop material attached to a second section of said strap body such that at least a portion of said section of loop material can be removably attached to at least a portion of said section of hook material to removably attach at least a portion of said first section of said strap body to at least a portion of said second section of said strap body.

2. A strap apparatus for holding a foldable boat seat including a seat back pivotally connected to a seat base in a folded down position, comprising:

an elongated strap body;

a first fastener for attaching said strap body to the seat base;

a second fastener for removably attaching said strap body to the seat back such that when said strap body is attached to the seat back at least a portion of said strap body extends between said first fastener and said second fastener, wherein said upper surface of said second fastener has a primary recessed section disposed therein, said primary recessed section having one or more screw openings disposed therein and extending through said base portion of said second fastener for receiving screws or other fastening devices for securing said second fastener to the seat back, and said second fastener further comprises a screw head cover capable of being inserted into said primary recessed section to cover screws or other fastening devices that extend through said one or more screw openings; and strap adjustment apparatus associated with said strap body, said strap adjustment apparatus being capable of adjusting the length of the portion of said strap body that extends between said first fastener and said second fastener when said strap body is attached to said seat back.

3. The boat seat of claim 2 wherein:

said first fastener includes an upper surface, a lower surface opposing said upper surface, a base portion attached to said seat base and a strap receiver including a slot for receiving said strap body;

said second fastener includes an upper surface, a lower surface opposing said upper surface, a base portion attached to said seat back and a strap receiver including a slot for receiving said strap, body wherein said upper surface of said second fastener has a primary recessed section disposed therein, said primary recessed section having one or more screw openings disposed therein and extending through said base portion of said second fastener for receiving screws or other fastening devices for securing said second fastener to the seat back, and said second fastener further comprises a screw head cover capable of being inserted into said primary recessed section for cover screws or other fastening devices that extend though said one or more screw openings; and said strap adjustment apparatus includes a hook and loop fastening system, said hook and loop fastening system including a section of loop material attached to a first section of said strap body and a section of hook material attached to a second section of said strap body such that at least a portion of said section of hook material can be removably attached to at least a portion of said section of loop material to removably attach at least a portion of said first section of said strap body to at least a portion of said second section of said strap body.

4. An adjustable strap apparatus, comprising:

an elongated strap body made of a material that has a high stretch resistance;

a first fastener for attaching said strap body to a first member, said first fastener including an upper surface, a lower surface opposing said upper surface, a base portion for attachment to said first member and a strap receiver including a slot for receiving said strap body;

a second fastener for removably attaching said strap body to a second member such that when said strap body is attached to said second member at least a portion of said strap body extends between said first fastener and said second fastener, said second fastener including an upper surface, a lower surface opposing said upper surface, a base portion for attachment to said second member and a strap receiver including a slot for receiving said strap body, wherein said upper surface of said second fastener has a primary recessed section disposed therein, said primary recessed section having one or more screw openings disposed therein and extending through said base portion of said second fastener for receiving screws or other fastening devices for securing said second fastener to said second member, and said second fastener further comprises a screw head cover capable of being inserted into said primary recessed section to cover screws or other fastening devices that extend through said one or more screw openings; and strap adjustment apparatus associated with said strap body, said strap adjustment apparatus being capable of adjusting the length of the portion of said strap body that extends between said first fastener and said second fastener once said strap body is attached to said second member, said strap adjustment apparatus including a hook and loop fastening system, said hook and loop fastening system including:

a section of loop material attached to a first section of said strap body; and a section of hook material attached to a second section of said strap body such that at least a portion of said section of hook material can be removably attached to at least a portion of said section of loop material to removably attach at least a portion of said first section of said strap body to at least a portion of said second section of said strap body.

5. A strap apparatus for holding a foldable boat seat including a seat back pivotally connected to a seat base in a folded down position, comprising:

an elongated strap body, said strap body being made of a material having a high stretch resistance;

a first fastener for attaching said strap body to the seat base;

a second fastener for removably attaching said strap body to the seat back such that when said strap body is attached to the seat back at least a portion of said strap body extends between said first fastener and said second fastener, wherein:

said second fastener includes an upper surface, a lower surface opposing said upper surface, a base portion for attachment to the seat back and a strap receiver including a slot for receiving said strap body;

said upper surface of said second fastener has a primary recessed section disposed therein, said primary recessed section having one or more screw openings disposed therein and extending through said base portion of said second fastener for receiving screws or other fastening devices for securing said second fastener to the seat back, and said second fastener further comprises a screw head cover capable of being inserted into said primary recessed section for cover screws or other fastening devices that extend through said one or more screw openings; and a strap adjustment apparatus associated with said strap body, said strap adjustment apparatus being capable of adjusting the length of the portion of said strap body that extends between said first fastener and said second fastener when said strap body is attached to said seat back, wherein said strap adjustment apparatus includes a hook and loop fastening system, said hook and loop fastening system including a section of hook material attached to a first section of said strap body and a section of loop material attached to a second section of said strap body such that at least a portion of said section of loop material can be removably attached to at least a portion of said section of hook material to removably attach at least a portion of said first section of said strap body to at least a portion of said second section of said strap body.

6. A strap apparatus for holding a foldable boat seat including a seat back pivotally connected to a seat base in a folded down position, comprising:

an elongated strap body;

a first fastener for attaching said strap body to the seat base;

a second fastener for removably attaching said strap body to the seat back such that when said strap body is attached to the seat back at least a portion of said strap body extends between said first fastener and said second fastener, said second fastener carrying an upper surface having a primary recessed section disposed therein, said primary recessed section having one or more screw openings disposed therein and extending through said base portion of said second fastener for receiving screws or other fastening devices for securing said second fastener to the seat back, and said second fastener further comprises a screw head cover capable of being inserted into said primary recessed section to cover screws or other fastening devices that extend through said one or more screw openings; and strap adjustment apparatus associated with said strap body, said strap adjustment apparatus being capable of adjusting the length of the portion of said strap body that extends between said first fastener and said second fastener when said strap body is attached to said seat back.

7. A foldable boat seat, comprising:

a seat base;

a seat back pivotally connected to said seat base such that said seat back can be folded down toward said seat base; and strap apparatus for holding said seat back in a folded down position, said strap apparatus including:

an elongated strap body, said strap body being made of a material having a high stretch resistance;

a first fastener attaching said strap body to said seat base, wherein said first fastener includes an upper surface, a lower surface opposing said upper surface, a base portion attached to said seat base and a strap receiver including a slot for receiving said strap body, wherein said upper surface of said second fastener has a primary recessed section disposed therein, said primary recessed section having one or more screw openings disposed therein and extending through said base portion of said second fastener for receiving screws or other fastening devices for securing said second fastener to the seat back, and said second fastener further comprises a screw head cover capable of being inserted into said primary recessed section for cover screws or other fastening devices that extend though said one or more screw openings; and a second fastener for removably attaching said strap body to said seat back such that when said strap body is attached to said seat back at least a portion of said strap body extends between said first fastener and said second fastener, wherein said second fastener includes an upper surface, a lower surface opposing said upper surface, a base portion attached to said seat back and a strap receiver including a slot for receiving said strap body;

a strap adjustment apparatus, said strap adjustment apparatus includes a hook and loop fastening system, said hook and loop fastening system including a section of loop material attached to a first section of said strap body and a section of hook material attached to a second section of said strap body such that at least a portion of said section of hook material can be removably attached to at least a portion of said section of loop material to removably attach at least a portion of said first section of said strap body to at least a portion of said second section of said strap body.

8. An adjustable strap apparatus, comprising:

an elongated strap body made of a material that has a high stretch resistance;

a first fastener for attaching said strap body to a first member, said first fastener including an upper surface, a lower surface opposing said upper surface, a base portion for attachment to said first member and a strap receiver including a slot for receiving said strap body;

a second fastener for removably attaching said strap body to a second member such that when said strap body is attached to said second member at least a portion of said strap body extends between said first fastener and said second fastener, said second fastener including an upper surface, a lower surface opposing said upper surface, a base portion for attachment to said second member and a strap receiver including a slot for receiving said strap body, wherein said upper surface of said second fastener has a primary recessed section disposed therein, said primary recessed section having one or more screw openings disposed therein and extending through said base portion of said second fastener for receiving screws or other fastening devices for securing said second fastener to said second member, and said second fastener further comprises a screw head cover capable of being inserted into said primary recessed section to cover screws or other fastening devices that extend through said one or more screw openings; and strap adjustment apparatus associated with said strap body, said strap adjustment apparatus being capable of adjusting the length of the portion of said strap body that extends between said first fastener and said second fastener once said strap body is attached to said second member, said strap adjustment apparatus including a hook and loop fastening system, said hook and loop fastening system including:
- a section of loop material attached to a first section of said strap body; and
- a section of hook material attached to a second section of said strap body such that at least a portion of said section of hook material can be removably attached to at least a portion of said section of loop material to removably attach at least a portion of said first section of said strap body to at least a portion of said second section of said strap body.

9. A strap apparatus for holding a foldable boat seat including a seat back pivotally connected to a seat base in a folded down position, comprising:
- an elongated strap body, said strap body being made of a material having a high stretch resistance;
- a first fastener for attaching said strap body to the seat base; and
- a second fastener for removably attaching said strap body to the seat back such that when said strap body is attached to the seat back at least a portion of said strap body extends between said first fastener and said second fastener, wherein said second fastener carries an upper surface, said upper surface of said second fastener has a primary recessed section disposed therein, said primary recessed section having one or more screw openings disposed therein and extending through said base portion of said second fastener for receiving screws or other fastening devices for securing said second fastener to the seat back, and said second fastener further comprises a screw head cover capable of being inserted into said primary recessed section for cover screws or other fastening devices that extend through said one or more screw openings.

* * * * *